(12) United States Patent

Achten et al.

(10) Patent No.: US 8,658,760 B2
(45) Date of Patent: Feb. 25, 2014

(54) FORMULATIONS BASED ON ANIONICALLY STABILISED, AQUEOUS POLYMER DISPERSIONS

(75) Inventors: Dirk Achten, Leverkusen (DE); Peter Kueker, Köln (DE); Juergen Kempkes, Köln (DE); Bianka Lorenz, Dormagen (DE); Mathias Matner, Neuss (DE); Winfried Jeske, Burscheid (DE); Jose Colinas-Martinez, Wermelskirchen (DE)

(73) Assignee: Bayer MaterialScience AG (DE)

( * ) Notice: Subject to any disclaimer, the term of this patent is extended or adjusted under 35 U.S.C. 154(b) by 84 days.

(21) Appl. No.: 13/062,538

(22) PCT Filed: Aug. 26, 2009

(86) PCT No.: PCT/EP2009/006158
§ 371 (c)(1),
(2), (4) Date: Jun. 7, 2011

(87) PCT Pub. No.: WO2010/025862
PCT Pub. Date: Mar. 11, 2010

(65) Prior Publication Data
US 2011/0237696 A1    Sep. 29, 2011

(30) Foreign Application Priority Data

Sep. 5, 2008    (DE) .................. 10 2008 045 805

(51) Int. Cl.
*C08L 11/02*    (2006.01)
(52) U.S. Cl.
USPC .......... 528/486; 156/325; 156/333; 521/150; 528/480; 524/507

(58) Field of Classification Search
USPC ........................................ 521/150
See application file for complete search history.

(56) References Cited

U.S. PATENT DOCUMENTS 4,904,724 A * 2/1990 Auchter et al. ............. 524/458
5,773,544 A    6/1998 Christell et al.
(Continued)

FOREIGN PATENT DOCUMENTS

CA    1155581 A1    10/1983
DE    3002734 A1    7/1981
(Continued)

OTHER PUBLICATIONS

"Solubility of Carbon Dioxide in Water at Various Temperatures and Pressures" in CRC Handbook of Chemistry and Physics, 93rd Edition, Internet Version 2013. Editor-in-Chief W.M. Haynes. Section 5 p. 153.*

(Continued)

*Primary Examiner* — Randy Gulakowski
*Assistant Examiner* — Christina Wales
(74) *Attorney, Agent, or Firm* — Novak Druce Connolly Bove + Quigg LLP

(57) ABSTRACT

Formulations based on anionically stabilized aqueous polymer dispersions, containing polychloroprene, to which carbon dioxide ($CO_2$) has been added, to a process for their preparation, to a device for increasing the carbon dioxide content of formulations based on anionically stabilized aqueous polymer dispersions, and to the use thereof in the production of adhesives, sealants, large-volume parts or coatings.

11 Claims, 1 Drawing Sheet

(56) References Cited

U.S. PATENT DOCUMENTS

Figure 1:
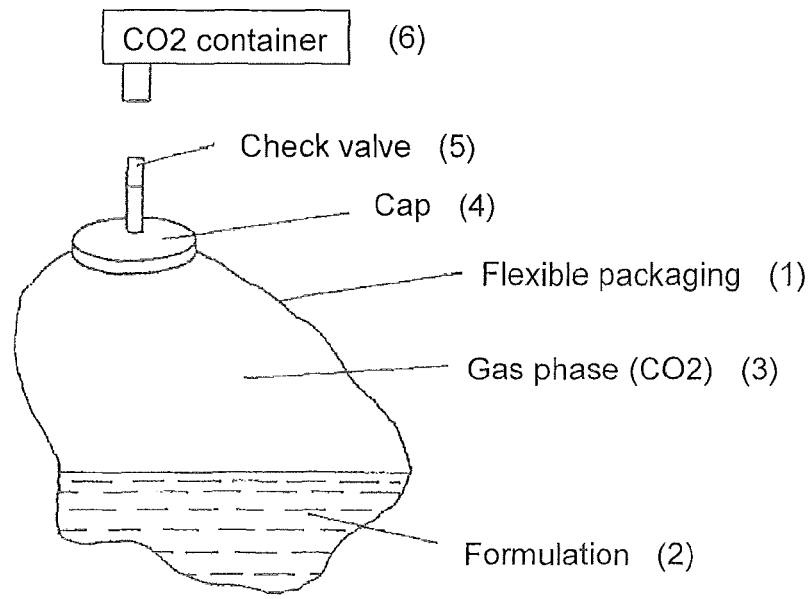

| | | | |
|---|---|---|---|
| 6,087,439 A * | 7/2000 | Ganster et al. | 524/591 |
| 6,767,947 B2 | 7/2004 | Musch et al. | |
| 7,148,277 B2 | 12/2006 | Grabowski et al. | |
| 2003/0221778 A1 | 12/2003 | Musch et al. | |
| 2005/0137309 A1 | 6/2005 | Musch et al. | |
| 2009/0258219 A1 * | 10/2009 | Pantke et al. | 428/327 |

FOREIGN PATENT DOCUMENTS

| | | | |
|---|---|---|---|
| JP | 09235417 A * | 9/1997 | |
| JP | 2007332207 A * | 12/2007 | |
| WO | WO 9614366 A1 * | 5/1996 | |
| WO | WO-02/24825 A1 | 3/2002 | |
| WO | WO-03/102066 A2 | 12/2003 | |
| WO | WO-2004/106422 A1 | 12/2004 | |

OTHER PUBLICATIONS

Martin-Martinez, J.M. "Polychloroprene rubber adhesives: modifiers and additives" in Handbook of Adhesion (2nd edition) edited by D.E. Packham. pp. 332-335.*

Dormish, J.F."Q&A about polyurethane" in Adhesives Magazine, Apr. 2010, p. 20.*

Obrecht, W. et al "Rubber, 4. Emulsion Rubbers" in Ullmann's Encyclopedia of Industrial Chemistry, 1999-2013. DOI 10.1002/14356007. p. 623-648.*

* cited by examiner

Supply of CO2 in flexible container

- CO2 container (6)
- Check valve (5)
- Cap (4)
- Flexible packaging (1)
- Gas phase (CO2) (3)
- Formulation (2)

Supply of CO2 in mixing pipe for use of formulation as spray adhesive

- (13) Inlet for further propellant gas, if required
- Spray nozzle (12)
- Mixing pipe (11)
- Inlets (9)
- Removable valve cap (10)
- Formulation in flexible packaging (7)
- CO2 container (8)

FORMULATIONS BASED ON ANIONICALLY
STABILISED, AQUEOUS POLYMER
DISPERSIONS

CROSS-REFERENCE TO RELATED
APPLICATIONS

This application is a national stage application, under 35 U.S.C. §371, of PCT/EP2009/006158, filed Aug. 26, 2009, which claims priority of German Application No. 10 2008 045 805.8, filed Sep. 5, 2008.

BACKGROUND OF THE INVENTION

Conventional contact adhesives of the prior art, for example based on polychloroprene, styrene-butadiene-styrene block copolymers, styrene-acrylate copolymers or polyurethanes, are predominantly solvent-containing adhesives.

For ecological and economic reasons, as well as for reasons of occupational safety and hygiene, there is a growing need for suitable aqueous dispersions which can be processed to corresponding solvent-free adhesive formulations.

State of the art are solvent-free contact adhesive formulations based on polychloroprene as the main constituent of the adhesive composition. An important quality feature for aqueous contact adhesive formulations is good wet-on-wet bondability on a wide variety of substrates (high adhesiveness or reactivity of the adhesive directly after application of the adhesive) combined with a high initial strength directly after joining of the substrates to be bonded.

The expression high initial strength is closely linked to the definition of a contact adhesive. Contact adhesives can in principle be applied at ambient temperature to substrates at ambient temperature. A sufficiently high initial strength is to be understood as being a strength directly after joining of the substrates that is sufficiently high for further processing of the joined parts so that slipping of the joined parts in the subsequent processing operation is avoided, or the bonded substrates exhibit a strength below the adhesion and cohesion strength of the adhesive layer so that, when a load is applied to the joined object, the joined part is generally destroyed before the adhesive layer.

Typically, commercially available dispersions must be destabilised or activated in order to achieve an adequate initial strength. A main problem in the formulation of reactive adhesives is the difficulty of linking adequate reactivity with adequate storage, temperature, shear and transport stability.

Conventional anionically stabilised dispersions or formulations based on polychloroprene usually have their pH value reduced in a targeted manner for that purpose and are consequently destabilised or activated and only then rendered capable of wet-on-wet adhesion. A disadvantage is that, as the pH value falls, the storage, temperature, shear and transport stability of such formulations also falls. Furthermore, oxidative and hydrolytic processes in the dispersions continuously set in motion further destabilising processes, which undoubtedly cause coagulation, or greatly reduced storage, temperature, shear and transport stability.

For the purposes of the present invention, activation is understood as meaning the establishment of initial adhesiveness in adhesive formulations, as well as the initiation of the binding or crosslinking process in the production of hydrogels, foams, coatings and seals.

It is also state of the art that anionically stabilised polymer dispersions are not permanently stable because the resinates used as the main emulsifiers and/or the fatty acids used as emulsifiers, as a result of conversion into their acid form, are no longer available as emulsifiers and effective stabilisation of the latex is no longer ensured.

It is further generally known that the addition of relatively large amounts of pH-stable, anionic emulsifiers based, for example, on sulfate or sulfonate, as well as non-ionic emulsifiers, in principle supports pH value stability at a pH value <9, but at the expense of the contact adhesiveness of the formulations due to increased foam formation and suppression of the coagulation of the latex particles or impairment of the film-forming properties.

A further method for destabilising anionically stabilised polychloroprene-containing dispersions in a targeted manner consists in adding additional electrolytes, which on the one hand increase the ionic strength of the water, and thereby reduce the effectiveness of the anionic emulsifiers, and render the emulsifiers that are present ineffective in their function as emulsion stabilisers in a targeted manner by coordinative and complexing effects and/or precipitation. For example, there are used for this purpose monovalent, divalent or trivalent inorganic salts, for example KCl, NaCl, $Na_2SO_4$, $ZnCl_2$, $MgCl_2$, $CaCl_2$, $AlCl_3$, $Al_2(SO_4)_3$, or inorganic or organic acids. A disadvantage which can be mentioned here too is reduced storage, temperature, shear and transport stability. Such formulations are referred to hereinbelow as 1-component adhesive formulations.

Of the acids and salts mentioned in the prior art which are suitable for the targeted destabilisation or activation of polychloroprene latices, only amino acids such as glycine or boric acid can be added directly without diluting the concentration of the desired latex. All other substances (salts, acids, buffers) must be added diluted to a greater or lesser extent in water in order to avoid direct coagulation of the latex on addition of the components. However, the use of glycine or boric acid likewise has disadvantages because, for example, glycine when used in high concentrations to achieve a low pH value has a strongly adverse effect on the bonding properties of the formulation owing to its surface-active action, and boric acid is in future to be classified as toxic. Post-activation of highly viscous formulations is possible by means of the mentioned acids typically only with great difficulty owing to their only slow distribution in the highly viscous formulations and the resulting excessive concentrations which, in combination with the mechanical stress in stirring apparatuses, leads to coagulate formation.

Overall, adhesive formulations based on anionically stabilised polychloroprene dispersions exhibit reduced storage, temperature, shear and transport stability even at a pH value <10.

A further problem in the formulation of 1-component adhesives based on anionically stabilised commercially available polychloroprene dispersions is that they liberate HCl in significant amounts during storage. This additional stress by additional lowering of the pH value leads in the case of ready-formulated reactive 1-component adhesive formulations to a further limitation of the storage, temperature, shear and transport stability.

Accordingly, in addition to the stability of the formulation, the pH value stability of a finished applied adhesive is also of interest, because HCl liberation can cause possible discolouration in the adhesive and on pH-sensitive substrates. A possible acid attack is conventionally counteracted by adding divalent, predispersed metal oxides (ZnO, MgO, CaO), in some cases present as nanoparticles, and/or aminic acid acceptors (e.g. described in WO-A 2004/106422).

Furthermore, application US-A 2003/221778 describes the use of silicic acid/water glass suspensions for improving the wet adhesiveness and the initial strength and final strength of polychloroprene contact adhesive formulations. In addition, viscosities are established in a targeted manner via silicic acid suspensions with the aid of pH value and mono- and/or divalent ions. The silicic acids disclosed in US-A 2003/221778 are sensitive both to a low pH value (<9) and to high concentrations, in particular of divalent ions/metal oxides (ZnO, MgO).

The use of carbon dioxide as a neutralising and coagulating agent in anionically stabilised dispersions has already been disclosed many times in the prior art. There, carbon dioxide is used as a weak acid for neutralising an anionically stabilised polymer dispersion, with the aim of direct coagulation in order to obtain a solid from the dispersion or for the purpose of creaming by agglomeration and freezing out of dispersions in order to improve the properties of the product for the production of latex foams. Fundamental for the described uses of carbon dioxide was always that destabilisation of an anionic dispersion by carbon dioxide has the result of effecting partial or final coagulation after a very short time. Alternatively, in the case of the creaming aid, the latex was subsequently rendered basic again, partly in order to improve the durability.

The problem of storage, temperature, shear and transport instability caused by targeted destabilisation/activation of an anionically stabilised adhesive formulation (1-component formulation) can be avoided if the destabilisation/activation does not take place until immediately before, with or by the application (2-component formulation or process). This activation is then typically effective immediately and leads to the direct coagulation or breaking of the formulation during application or on the substrates. As a result, substrates wetted therewith can immediately be joined under pressure with outstanding wet-on-wet adhesive properties.

These 2-component adhesives are conventionally composed of an anionically stabilised dispersion or formulation containing polychloroprene and a separate destabilising or activating component.

An example of this process is the "spray-mix" process. In this process, the adhesive and a coagulating agent are fed separately in a spray gun, mixed in the spray jet and coagulated while still in flight and/or on the joined part. As destabilising component there can be used, for example, concentrated aqueous solutions of alkali metal, alkaline earth metal ions, trivalent aluminium ions, inorganic/organic acids, or mixtures thereof.

Disadvantages of this process are the high outlay in terms of apparatus, the mixing process, which is susceptible to errors, and the typically high ion concentrations in the resulting adhesives, which can lead to increased equilibrium water swelling or—in the case of the use of acids—to corrosion in connection with metal substrates when low pH values are established. Furthermore, as a result of this process, increased amounts of water are typically carried into the formulations by the second component, which can lead to problems with drying processes and excessive residual moisture contents in the products, for example with the risk of corrosion of sensitive substrates. The process is comparatively time- and cost-intensive and is therefore unsatisfactory from an economic point of view.

BRIEF SUMMARY OF THE INVENTION

The invention relates to formulations based on anionically stabilised aqueous polymer dispersions, containing polychloroprene, to which carbon dioxide ($CO_2$) has been added, to a process for their preparation, to a device for increasing the carbon dioxide content of formulations based on anionically stabilised aqueous polymer dispersions, and to the use thereof in the production of adhesives, sealants, large-volume parts or coatings.

Accordingly, it was an object of the present invention to provide ecologically and economically advantageous, temperature-, ageing-, storage-, shear- and transport-stable aqueous adhesive compositions which, after application to the substrates to be bonded, permit wet-on-wet joining under pressure after a short time (waiting time <5 minutes) with sufficiently high initial strength (wet strength), in particular in the still moist condition, even on substrates that are difficult to bond.

Surprisingly, it has been found that the object is achieved by the addition of gaseous carbon dioxide to a formulation based on an aqueous polymer dispersion containing an anionically stabilised polychloroprene dispersion, wherein the carbon dioxide, after addition to the polymer dispersion, is present as carbonic acid in dissolved form in a dissociation equilibrium.

DETAILED DESCRIPTION OF THE INVENTION

The present invention provides a formulation based on an aqueous polymer dispersion containing, based on the solids content, >20 wt. %, preferably >40 wt. %, particularly preferably >50 wt. %, of an anionically stabilised polychloroprene dispersion, wherein the total solids concentration=100 wt. %, characterised in that, at a pH value of from 6 to 10, the amount of dissolved carbonic acid in the dissociation equilibrium is from 0.0001 to 2 wt. %, based on the dispersion.

The formulation according to the invention preferably has a pH value of from 6.5 to 9.5 and a content of dissolved carbonic acid of from 0.001 to 1 wt. %, particularly preferably a pH value of from 7 to 9 and a content of dissolved carbonic acid of from 0.003 to 0.9 wt. %, most particularly preferably a pH value of from 7.5 to 8.5 and a content of dissolved carbonic acid of from 0.01 to 0.25 wt. %.

Furthermore, the alkali ion concentration ($Na^+$ and $K^+$ in total) in the formulation according to the invention is from 500 to 10,000 ppm, preferably from 700 to 6000 ppm, particularly preferably from 900 to 4000 ppm.

Before the addition of carbon dioxide, the polymer dispersions to be used have a starting pH value >6.5, preferably >8, particularly preferably >9.5, most particularly preferably >10. Because activation with carbon dioxide is only carried out shortly before application, the aqueous polymer dispersions containing an anionically stabilised polychloroprene dispersion exhibit markedly improved storage, temperature, shear and transport stability at a pH value >10. Advantageously, the activation by means of carbon dioxide can be carried out, owing to the outstanding solubility and distribution speed, even in very highly viscous polymer dispersions/formulations, without resulting in premature coagulation.

When activation is complete, the formulation according to the invention is still coagulate-free for >5 minutes.

DETAILED DESCRIPTION OF THE INVENTION

Suitable polychloroprene dispersions are prepared by emulsion polymerisation of chloroprene optionally containing copolymerisable ethylenically unsaturated monomers in an alkaline medium. Polychloroprene preparation has been known for a long time; it is carried out by emulsion polymerisation in an aqueous alkaline medium, see "Ullmanns Encyclopädie der technischen Chemie", Volume 9, p. 366, Verlag Urban and Schwarzenberg, Munich-Berlin 1957; "Encyclopedia of Polymer Science and Technology", Vol. 3, p. 705-

730, John Wiley, New York 1965; "Methoden der Organischen Chemie" (Houben-Weyl) XIV/1, 738 f. Georg Thieme Verlag Stuttgart 1961, WO-A 02/24825 (p. 3 1.26-p. 7 l. 45), DE-A 30 02 734 (p. 8, l. 23-p. 12, 1. 9) or U.S. Pat. No. 5,773,544 (col. 2, l. 9-col. 4 l. 45). The polymerisation can be carried out continuously, as described in WO-A 02/24825, Example 2 and DE-A 30 02 734, Example 6.

There come into consideration as emulsifiers in principle any compounds and mixtures thereof that stabilise the emulsion sufficiently, such as, for example, the water-soluble salts, in particular the sodium, potassium and ammonium salts, of long-chained fatty acids, colophony and colophony derivatives, higher molecular weight alcohol sulfates, arylsulfonic acids or formaldehyde condensation products of arylsulfonic acids. Co-emulsifiers which may be mentioned by way of example include non-ionic emulsifiers based on polyethylene oxide and polypropylene oxide, as well as polymers having an emulsifying action, such as polyvinyl alcohol.

Polychloroprenes which are suitable according to the invention can be prepared in an alkaline emulsion, at temperatures of from 0 to 70° C., in the presence of from 0 to 20 parts by weight, based on 100 parts by weight of chloroprene, of copolymerisable ethylenically unsaturated monomers in the presence of from 0 to 1 mmol of a regulator, based on 100 g of monomer.

Activation of the polymerisation is carried out by conventional activators or activator systems. Examples of activators and activator systems which may be mentioned include: formamidinesulfinic acid, potassium peroxodisulfate, redox systems based on potassium peroxodisulfate and optionally silver salt (sodium salt of anthraquinone-β-sulfonic acid), wherein, for example, compounds such as formamidine-sulfinic acid, the sodium salt of hydroxymethanesulfinic acid, sodium sulfite and sodium dithionite serve as redox partners. Redox systems based on peroxides and hydroperoxides are also suitable. The preparation of the polychloroprenes which are suitable according to the invention can be carried out both continuously and discontinuously.

Copolymerisable monomers are compounds having from 3 to 12 carbon atoms and 1 or 2 copolymerisable C=C double bonds per molecule. Examples of preferred copolymerisable monomers are 2,3-dichlorobutadiene and 1-chlorobutadiene, acrylonitrile, acrylic acid, maleic acid, fumaric acid or ethylene glycol dimethaciylate.

In order to adjust the molecular weight of the polychloroprenes which are suitable according to the invention, it is possible to use chain transfer agents such as mercaptans, xanthogen disulfides or dithiocarbamates. As polymerisation inhibitor or stopper when a desired monomer conversion of up to 95% has been reached, it is possible to add, for example, phenothiazine, tert-butylpyrocatechol or diethylhydroxylamine.

In addition to the anionically stabilised polychloroprene dispersion, the formulations according to the invention can optionally contain further constituents. Examples which may be mentioned include polyacrylate dispersions, polyurethane dispersions, polyurethane-polyacrylate dispersions, styrene-butadiene dispersions or acrylonitrile-butadiene dispersions. A mixture of suitable compatible aqueous polymer dispersions with one another can also be present.

The formulation according to the invention preferably has a pH value of from 6.5 to 9.5 and a content of dissolved carbonic acid of from 0.001 to 1 wt. %, particularly preferably a pH value of from 7 to 9 and a content of dissolved carbonic acid of from 0.003 to 0.9 wt. %, most particularly preferably a pH value of from 7.5 to 8.5 and a content of dissolved carbonic acid of from 0.01 to 0.25 wt. %.

In addition to the polychloroprene dispersion, the formulations according to the invention optionally contain further auxiliary substances and additives.

For example, it is possible to add fillers such as quartz flour, quartz sand, highly disperse silicic acids (suspensions or solid), heavy spar, calcium carbonate, chalk, dolomite, aluminium hydroxide, aluminium oxide or talcum, optionally together with wetting agents, for example polyphosphates (such as sodium hexametaphosphate), naphthalenesulfonic acid, ammonium or sodium polyacrylic acid salts, as well as alkali and alkaline earth salts of phosphoric acid, the fillers generally being added to the formulation in amounts of from 0 to 60 wt. %, based on the total solids concentration=100 wt. %, and the wetting agents generally being added in amounts of from 0 to 1 wt. %, based on the filler. Further possible auxiliary substances are, for example, organic thickening agents, such as cellulose derivatives, alginates, starch, starch derivatives or polyacrylic acid, which are to be used in amounts of from 0 to 3 parts by weight, based on the polychloroprene concentration=100 parts by weight, or inorganic thickening agents, such as, for example, bentonites, which are to be used in amounts of from 0 to 10 parts by weight, based on the polychloroprene concentration=100 parts by weight. For preservation purposes, fungicides and bactericides can also be added to the adhesive composition according to the invention. These are generally used in amounts of from 0 to 1 wt. %, based on the formulation. Suitable fungicides are, for example, phenol and cresol derivatives or organotin compounds.

It is optionally possible to add to the adhesive composition in molten or in dispersed form also tackifying resins, such as, for example, unmodified or modified natural resins such as colophony esters, hydrocarbon resins or synthetic resins such as phthalate resins. Preference is given to alkylphenol resin dispersions having softening points greater than 110° C. Organic solvents such as, for example, toluene, xylene, butyl acetate, methyl ethyl ketone, ethyl acetate, dioxane, acetone, ethanol, glycol, glycerol or mixtures thereof, or plasticisers such as, for example, those based on adipate, phthalate or phosphate, can optionally be added to the polychloroprene dispersions, advantageously when there are no restrictions in respect of fogging or the exceeding of limit values as well as compulsory labelling.

It is likewise possible for the formulations according to the invention to contain additional activators, such as, for example, monovalent, divalent or trivalent inorganic salts, for example LiCl, KCl, NaCl, $ZnCl_2$, $MgCl_2$, $CaCl_2$, ZnO, MgO, $FeCl_3$, $AlCl_3$, $Al_2(SO_4)_3$, or inorganic or organic acids, for example HCl, boric acid, phosphoric acid, as well as acetic acid, glycine or other suitable amino acids, tartaric acid, citric acid, or their alkali and alkaline earth salts, as well as arbitrary combinations of salts and acids, such as buffer systems, for example the simple sodium or potassium salt of phosphoric acid ($KH_2PO_4$), $NaHCO_3$ or $KHCO_3$. These can be used to pre-activate the aqueous polymer dispersions, that is to say to establish a particular initial pH value. Furthermore, the formulations according to the invention can additionally contain hydrophilised polyisocyanates based on preferably aliphatic isocyanates, for example IPDI or HDI. Suitable for this purpose are, for example, water-dispersible polyisocyanate preparations of an aliphatic polyisocyanate and a reaction product of an aliphatic polyisocyanate with a mono- or di-hydric, non-ionic polyalkylene ether alcohol as emulsifier, for example based on isocyanates and biurets and allophanates based on 1,6-diisocyanatohexane (HDI) and/or isocyanurates based on 1-isocyanato-3,5,5-trimethyl-5-isocyanatomethyl-cyclohexane (IPDI). Correspondingly modified polyisocyanate mixtures are likewise suitable. Also suitable are polyisocyanates or polyisocyanate mixtures having an isocyanurate structure based on HDI, IPDI and/or 4,4'-diisocyanatodicyclohexylmethane.

Suitable non-ionic emulsifiers are also polyisocyanates modified by polyvinylpyrrolidone. As dispersing-active constituents there are also used polyalkylene oxide ethers containing carboxylic acid groups, or polyether ester alcohols.

The formulations according to the invention can contain further constituents, for example colloidally distributed nanodisperse silicic acid suspensions in water (WO 03/102066, p. 3, 1. 14 to p. 6, 1. 5), carbon blacks, other dispersible fillers, stabilisers such as, for example, hydrolysis inhibitors, antioxidants, light/UV stabilisers, plasticisers, flow aids, wetting agents, thickeners or colourings. The use of nanodisperse silicic acid suspensions in water is preferred. The formulations according to the invention particularly preferably contain nanodisperse silicic acid dispersions in amounts of up to 70 wt. %, preferably up to 50 wt. %, particularly preferably up to 20 wt. %, based on the total solids content of the formulation.

The formulations according to the invention have open times of >5 minutes, preferably >2 hours, particularly preferably >8 hours and most particularly preferably >24 hours, at a pH value <10, preferably <9.5, particularly preferably <9.

Within the scope of the present invention, the open time is defined as the period of time after preparation of the formulation according to the invention in which >50% of the initial strength is retained (measured directly after bonding of the substrates) compared with the optimal strength which can be achieved with that adhesive formulation in connection with given substrates.

The viscosities of the formulations according to the invention can be adjusted as desired over a wide range. The formulations according to the invention have a viscosity of from 1 to 200,000 mPas, preferably from 5 to 100,000 mPas, particularly preferably from 10 to 10,000 mPas, particularly preferably from 20 to 5000 mPas and most particularly preferably from 50 to 4000 mPas.

The formulations according to the invention have a solids concentration of from 10 to 80 wt. %, preferably from 20 to 70 wt. %, particularly preferably from 25 to 65 wt. % and most particularly preferably from 30 to 60 wt. %.

The present invention also provides a process for the preparation of the formulation according to the invention, characterised in that carbon dioxide in an amount, per liter of formulation, of from 0.1 to 20 liters, preferably from 0.2 to 10 liters, particularly preferably from 0.5 to 5 liters, most particularly preferably from 0.8 to 3 liters, is fed at from 1 to 100° C. and from 0.8 to 10 bar to an aqueous polymer dispersion containing an anionically stabilised polychloroprene dispersion.

The carbon dioxide volumes can be supplied, for example, by overlayering of the dispersion inside a resilient vessel. For example, a vessel having a volume of 20 liters can be filled with X<18 liters of dispersion (optionally with the exclusion of air) and then filled up with 20-X liters of carbon dioxide. After shaking or stirring or storing the vessel until the desired reduction in volume of the carbon dioxide gas phase has been achieved by absorption into the dispersion, the aqueous polymer dispersion is activated. Any excess carbon dioxide is let off.

The supply of carbon dioxide is effected, for example, by introduction, passing through, passing over or overlayering, by means of static or dynamic mixers, inside mixing pipes, also in the form of carrier gas or propellant gas. The carbon dioxide sources used are, for example, compressed-gas containers, such as bottles, cartouches or cartridges, chemical reactions of, for example, alkali carbonates with suitable acids in situ, liquids saturated with carbon dioxide (e.g. water, mineral water, soft drinks) or carbon dioxide obtained from the sublimation of dry ice or a reversible carbon dioxide absorber. Preference is given to mechanically contactless methods such as passing over or overlayering, where the formulation to be activated does not come into contact with the metering unit. Contamination or blocking of the metering unit by the possible formation of coagulate is thus avoided. Preference is likewise given to the use of carbon dioxide directly as a carrier gas or propellant gas for the application, for example in the form of spray cans containing the formulation and carbon dioxide in separate phases or the mixing of the polymer dispersion and carbon dioxide in a defined flow region, for example by means of a static mixer or simple hose section of suitable length prior to application. Preference is given to the metered addition of carbon dioxide from a pressure cylinder, cartouche or cartridge by means of simple mobile valve systems analogous to bicycle and motor vehicle tyre valves, it being possible for the valve system to be mounted reversibly, for example, on the adhesive formulation packaging. After the introduction of the desired amount of carbon dioxide, the original cap can be replaced if required and the container can be shaken, stirred and stored until the formulation is saturated with the added carbon dioxide. In the case of flexible containers, the progress of the activation can easily be monitored by the reduction in volume of the vessel.

The present invention also provides a device for the metered addition of carbon dioxide to aqueous polymer dispersions, characterised in that a container or flexible packaging (1) contains an aqueous phase of a polymer dispersion or formulation (2) and a carbon dioxide gas phase (3), having a cap (4) to the end of which there is attached a check valve (5) through which carbon dioxide can be introduced from a suitable carbon dioxide container (6) (FIG. 1).

The supply of carbon dioxide is preferably effected by means of a gas bottle before application of the formulation according to the invention in a period of <14 days, preferably <7 days, particularly preferably <1 day and most particularly preferably <8 hours. If the supply of carbon dioxide takes place in a period of <7 days prior to application, this formulation is defined as a 2-component formulation within the scope of this invention. If, within the scope of the invention, the addition of carbon dioxide takes place ≥7 days prior to application of the formulation and bonding of the substrates, and if the formulation does not exhibit any significant loss of adhesive properties according to the definition of open time even after an open time of 7 days, then the term 1-component formulation is used hereinbelow.

The formulations according to the invention are preferably adhesive formulations. These are preferably used in the form of 1K formulations or 2K formulations.

The formulations according to the invention are applied to any desired substrate by means of brushing, roller application, spray application, screen printing, stamping, spin coating, electrospinning or other known application variants. The activation with carbon dioxide can be carried out in situ prior to application and the degree of activation can be established so that the stability and open time, as well as the concentration and viscosity, can be adapted to the application requirements by optionally diluting the formulation with water, for example.

The formulations according to the invention have a pH stability according to DIN 53381, Method B, of >1 hour, preferably of >2 hours, particularly preferably of >3 hours and most particularly preferably of >4 hours.

Bonds of substrates obtained by using the formulations according to the invention, after application of the formulations to both sides of the substrates to be bonded and pressing the substrates under a pressure of 4 bar and for 10 seconds, after drying times at 50% humidity and 23° C. of <20 minutes, preferably <10 minutes, particularly preferably <5 minutes, most particularly preferably <1 minute, exhibit an initial strength of >0.3 N/mm, preferably of >0.5 N/mm and particularly preferably of >0.8 N/mm in the 180° peel test at 23° C., in so far as the strength and elasticity of the substrate permit this measurement.

Suitable substrates are those which are wetted by the formulation according to the invention with a contact angle of >30°, preferably of >50°, particularly preferably of >70°. As typical substrates there may be mentioned open- or closed-pore porous materials having a density of <1 kg/liter, as well as foams based on polyurethanes, latex foams (SBR, NBR, NR, PVC, CR), polystyrene, melamine-formaldehyde resin foams and others, as well as stone, ceramics, leather, woven fabrics, knitted fabrics, meshwork, mats, thermoplastics, elastomers, elastomeric vulcanates, thermoplastic elastomers, thermoplastic urethanes, thermoplastic vulcanates, duromers, wood, composite materials, metals, lacquered metal sheets and arbitrary combinations of the mentioned materials in a wide variety of forms.

The formulations according to the invention can also be used in the production of foamed, optionally tacky sealants and insulating materials, as well as in the production of mouldings, coatings, adhesive foams or in the production of dipped goods.

Foaming of the formulations is carried out by means of a carrier gas, for example $N_2$, $N_2O$, $O_2$, air, butane, fluorinated and perfluorinated propellant gases, with preference being given to carbon dioxide. The foam can also be applied from a spray can.

It is also possible for a formulation according to the invention to be applied to substrates as an adhesive in the form of an aerosol by means of a spray can. In this case, the product is preferably discharged from a removable nozzle and mixing pipe combination in which mixing of the starting dispersion and the carbon dioxide carrier gas to prepare the formulation according to the invention is carried out spatially separate from the storage containers so that the outlet valves for the dispersion and carbon dioxide do not come into contact with the formulation according to the invention, or alternatively a valve prevents return to the storage vessels.

In the device according to the invention there is preferably arranged around the container (7) containing the starting dispersion or formulation a further hollow container (8) which contains the gaseous carbon dioxide, wherein there are separate inlets (9) to both container (7) and container (8), which inlets terminate in an optionally removable valve cap (10) on the end of which there sits, after a removable mixing section, for example in the form of a mixing pipe or static mixer (11), a spray or foaming nozzle (12) which is likewise optionally removable. If required, additional propellant/carrier gas can be metered in from a separate inlet (13) (FIG. 2).

Figure 2:
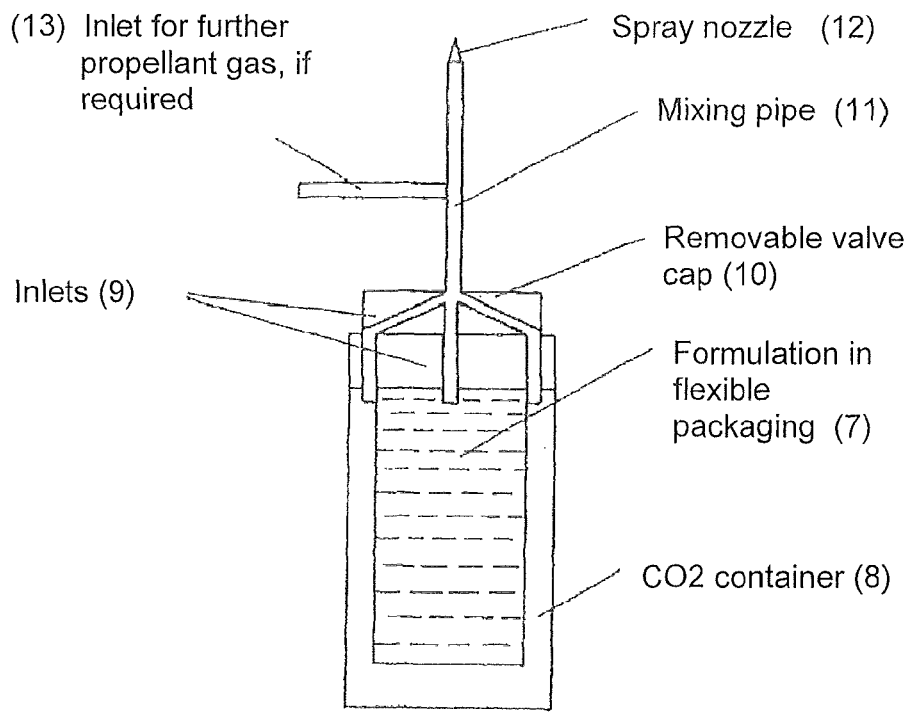

Preference is also given to a device analogous to FIG. 2 in which container (8) is mounted inside container (7), operation of the device otherwise being analogous.

The present invention relates also to the use of the formulations according to the invention in the preparation of hydrogels. The hydrogels are obtainable from the formulation according to the invention after carbon dioxide has been added and the open time has been exceeded.

The controlled gelling of the formulation according to the invention to form hydrogels after activation by carbon dioxide results in a stable, non-porous hydrogel having unusually low shrinkage and good compression set with hardnesses of from 1 to 100 Shore A, preferably from 5 to 90 Shore A, particularly preferably from 20 to 80 Shore A. This hydrogel is suitable as a joint-filling sealant and insulating material, as well as a moulding that fills any desired moulds. Possible fields of use of this hydrogel are, for example, as a joining and sealing material, as a static bearing, as a dynamic damper, as a floor covering or as casting compositions. It is advantageous that the hydrogel is initially pourable within the open time in any desired viscosity and cures uniformly only after the open time.

In a particular embodiment, the formulation according to the invention can additionally exhibit self-vulcanisation after solidification at room temperature to form the hydrogel, for example by addition of ultra-accelerators to the formulations according to the invention, and/or in combination with ZnO, and/or by the use of hydrophilised isocyanates. In this manner, stable chloroprene-based hydrogels crosslinked at room temperature are obtainable in a wide range of hardnesses and elasticities.

In addition, after activation with carbon dioxide, it is also possible to produce from the formulations according to the invention, owing to facilitated coagulation and deposition in dipping baths, for example, gloves, condoms, balloons or similar articles produced by dipping processes.

An advantage of the formulation according to the invention is that coagulation before application (with open times >5 minutes) can be reliably avoided. The formulations according to the invention are metastable, highly reactive adhesive formulations having a broad variability of viscosity and solids content, which have excellent wetting and wet-on-wet adhesion properties.

A further advantage of the formulations according to the invention is that, when the open time is exceeded and the formulations solidify to form hydrogels, these do not have to be disposed of as special waste under current legislation. Furthermore, solidified waste can be re-used, after grinding and drying, as rubber flour or as a raw material for solvent-based adhesive formulations.

The use according to the invention of carbon dioxide as activating agent, unlike other commercial activating agents, additionally does not have a significant adverse effect on the toxicological properties, the water swelling and adhesive-related parameters, such as strength, temperature resistance, ageing resistance, softening point of the formulation according to the invention and of the bond according to the invention produced therefrom.

A further important advantage of carbon dioxide as activating agent is the antibacterial action of carbon dioxide, which means that it is frequently not necessary additionally to provide the formulation with antibacterial and fungicidal properties.

Furthermore, a high degree of ageing can be accepted in the case of formulations according to the invention. The hydrolysis, resulting from ageing, of the allylic chlorine atoms and a consequently reduced pH value can be compensated for in a targeted manner by the flexible use of carbon dioxide, without consequent variations in the quality and properties of the bond or application.

EXAMPLES

A. Materials Used

TABLE 1

Polychloroprene dispersions

| Product | Supplier |
|---|---|
| Dispercoll ® C 84, solids content 55%, pH 13, crystallises rapidly | BMS AG, Lev., DE |
| Dispercoll ® C 74, solids content 58%, pH 13, crystallises normally | BMS AG, Lev., DE |
| Dispercoll ® C VPLS 2372H, solids content 58%, pH 13, crystallises slowly | BMS AG, Lev., DE |
| Dispercoll ® C VPLS 2325, solids content 55%, pH 13, crystallises rapidly | BMS AG, Lev., DE |
| Dispercoll ® C XP 2694, solids content 29%, pH 9, crystallises rapidly | BMS AG, Lev., DE |

TABLE 2

Silicic acid suspensions

| Product | Supplier |
|---|---|
| Dispercoll ® S3030, solids content 30% | BMS AG, Lev., DE |

TABLE 3

Stabilisers

| Product | Supplier |
|---|---|
| Rhenofit ® DDA-EM 50, dispersed styrolised diphenylamine derivative | Lanxess AG, Lev., DE |
| Borchers ® VP 9802, ZnO as 30% dispersion | OMG Borchers GmbH, Langenfeld, DE |

TABLE 4

Isocyanate crosslinker

| Product | Supplier |
|---|---|
| Bayhydur ® 401/70, hydrophilically modified aliphatic polyisocyanate based on 70% isophorone diisocyanate | BMS AG, Lev, DE |

TABLE 5

Additives

| Product | Supplier |
|---|---|
| Levanyl ® red, green, blue, pigments | Lanxess AG, Leverkusen, DE |
| Carbon dioxide various compressed-gas bottles/cartouches Food grade, as well as dry ice, citric acid (powder) + sodium hydrogen carbonate (powder) + water in a ratio 1.5:1:50. | |
| Borchigel ® Ala, thickener | OMG Borchers GmbH, Langenfeld, DE |
| Plextol ® 4545, polystyrene-acrylate dispersion, 50% | Polymerlatex GmbH, Marl, DE |
| Glycine, amino acid | Merck, PA grade |

B) Measuring Methods

Determination of the Viscosity:

The viscosity of the dispersions is determined by means of a Brookfield viscometer typically at RT and 60 revolutions/minute using spindle 2. According to the viscosities found, the spindle and the speed of rotation are varied according to the viscometer instructions in order to minimise measuring errors. In order to study rheological properties, the same measuring body (spindle) is advantageously used with different speeds.

Determination of HCl Stability:

Testing of the dried adhesive samples is carried out in accordance with DIN 53381, Method B.

Measuring Procedure:

Measuring device: 763 PVC—Thermomat from Metrohm, CH-9101 Herisau, Switzerland

The samples (thickness 0.1-1 mm) are cut to an edge length of about 2-3 mm, 0.2 g is weighed into a test tube, and the measurement is carried out at 180° C. and with air as carrier gas. The resistance of water in which the resulting HCl gas dissolves again is measured. As the HCl stability, the time at which the resistance has achieved a value of 50 μS/cm is given. The higher the value, the more stable the measured sample to HCl liberation.

Determination of Reactivity in Respect of Wet-on-Wet Bonding by Means of Spray Application to Polyurethane Foam Bodies:

The adhesive formulation is applied to the test material by means of a Walther PILOT type: XIII-ND spray gun at an air pressure of about 3 bar. The test material used is PU foam bodies, as follows: foam grade: STN/Schaumstoff-Technik-Nürnberg GmbH, type: ST 5540, dimensions test specimen: 101×49×30 mm material basis: PUR, colour: white, gross weight (kg per m3): 40; net bulk density (kg per $m^3$) ISO-845: 38; 40% compression hardness (kPa) DIN EN ISO 3386: 5.5; tensile strength (kPa) DIN EN ISO 1798: >120; elongation at break (%) ISO-1798: >110; compression set (50%/70° C./C22 h) DIN EN ISO-1856: <4.

In order to evaluate the adhesiveness and initial strength, the test specimens, after application of adhesive of about 50-150 g/$m^2$ wet, are bent in the middle using a wooden rod, immediately and after different drying times, and are guided within a period of <3 seconds between 2 steel rollers spaced 10 mm apart. The minimal waiting time until the bond has adequate immediate strength, so that the return forces of the foam do not open the bond again after passing through the gap, is noted, as is the longest time for which successful bonding is still possible (open time).

In an alternative procedure, the adhesive formulation (where the viscosity of the adhesive formulation must be <100 mPas) is applied by means of a Wagner W 550 fine spray system by means of a minimal nozzle or analogous fan-operated "pressureless (<0.5 bar)" application systems. Testing of the adhesiveness and initial strength is carried out as above.

Determination of the Heat Resistance of Foam Bonds:

The foam bonds as described above are tempered in a hot-air oven which has been preheated to 70° C. or 90° C. or 100° C. or 120° C. and the time until the bond fails is determined.

Determination of the Solids Content of the Formulations:

The test is carried out by weighing about 10 g of formulation onto a filter paper in an aluminium dish and drying for 1 hour at 110° C. in a circulating air oven. The dried sample is weighed, and the solids content is determined from the difference compared with the original weight.

Determination of the Stability of Formulations:

The stability of formulations is determined visually in the case of highly viscous formulations by looking for particles, lumps and in the case of low viscosity formulations by filtration through a sieve of mesh size <600 micrometers.

Determination of the Open Time of Formulations:

In order to determine the open time of the formulations, they are tested after activation (completion of the formulation) in the bonding of Satra leather by application to both sides of 2*10 cm test specimens in strip form after a drying time of 10 minutes, pressing under 2 bar for 5 seconds and subsequent measurement of the initial strength by means of the 180° peel test in N/mm. This procedure is repeated after 30 minutes, 1 hour, 4 hours, 8 hours, 24 hours, 3 days, 7 days and 14 days. If strengths >50% of the optimum strength are obtained, then the formulation is regarded as being still within the open time. 3 individual measurements are carried out in each case.

Determination of the Peel Strength on KASX Test Specimens:

The test is carried out in accordance with EN 1392. A 100 μm thick wet film of the dispersion is applied to two test specimens (KASX rubber, roughened, 100×30 mm) and, unless described otherwise, is exposed to air for one hour at room temperature. The test specimens are then joined for 10 seconds at 4 bar. A tear test is carried out by means of the 180° peel test on a commercial tensile testing machine at room temperature. The strength values in N/mm immediately after bonding and optionally after given waiting times are measured.

Determination of the Dimensional Stability Under Heat:

The KASX (NBR rubber) test specimens are bonded with a 2 cm$^2$ overlap, a load of 4 kg is applied, and the specimens are tempered for 30 minutes at 40° C. in a heating cabinet. The test specimens are then heated to 150° C. at a linear heating rate of 0.5° C./minute. The softening temperature, i.e. the temperature in ° C. at which the bond fails under the 4 kg load in the shear test, is recorded. 5 individual measurements are carried out in each case.

Determination of the pH Value:

A single-rod measuring electrode (e.g. Sentron pH meter) is immersed in the dispersion or solution to be tested. This contains a measuring electrode and a reference electrode. The potential difference between the measuring electrode and the reference electrode is read off on the measuring device as the pH value. The manufacturer's operating instructions are to be followed for handling of the single-rod measuring electrode. Alternatively, the pH value can be determined by means of measuring rods or initiator paper or by means of indicator solution.

Shore A Hardness Determination of the Hardness of Hydrogels:

To this end, about 2*2*1 cm test specimens are prepared from the hydrogels and measured by means of a conventional Shore A hardness measuring device. Measurement is carried out at 3 points, directly after preparation of the test specimen and after drying for 90 hours at 50° C. in a circulating air drying cabinet. The mean value is recorded in each case.

Determination of Volume/Mass Constancy of Large-Volume Bodies/Hydrogels:

To this end, about 2*2*1 cm test specimens are prepared from the hydrogels, measured exactly and weighed. The measurement is repeated after storage for 90 hours at 50° C. in a circulating air drying cabinet, and the volume and mass constancy are calculated therefrom.

Determination of the Viscosity Stability of the Formulations after Ageing:

The test is carried out by repeatedly measuring the viscosity of the adhesive formulations by means of a Brookfield viscometer after storage for preferably 3 days at 70° C.

D) Preparation Process

Preparation Process for the Adhesive Formulations According to the Invention:

General process for the preparation of adhesive formulations: For the preparation of the formulation according to the invention, a latex in the form of a single component or in a mixture with other latices as available commercially is placed in a glass beaker, with stirring. The antioxidant and the zinc oxide in the form of a dispersion, as well as further constituents such as resins, tackifiers, fillers, thickeners, colourings, are then added in succession, as required, with stirring. The silica sol (Dispercoll® S) is then added as required, with stirring. The concentration of the formulation is adjusted as required to the desired value by means of deionised water.

General Method for Activating Adhesive Formulations:

When all the desired constituents have been mixed in, the initial pH value is adjusted by means of glycine and/or boric acid and/or any desired dilute salts, acids or buffers suitable for activating the formulation, with stirring, to the target pH value of the formulations. The dilution at which the corresponding salts and acids are used is described in each case.

According to the invention, the final adjustment of the pH value to the target pH value is carried out by means of carbon dioxide, for example by introduction or overlayering or passing through until the target pH value has been reached; excess carbon dioxide is then removed by flushing with air.

Unless indicated otherwise, the amounts [parts by weight] of the formulations are given as solid based on the solids content of the main component (polymer dispersion)=100 parts by weight. In some cases, the main component, if it consists of related polymer dispersions, can also be divided up, a total of 100 parts by weight again being obtained.

Alternatively, amounts by volume of the formulations can be mentioned expressly.

E) Examples

Tests which are not according to the invention are always identified hereinbelow by * after the test number.

Drying time (1) means waiting time after adhesive application until successful bonding of PU foams [min.]. Application is carried out about 1 hour after completion of the adhesive formulation.

Drying time (2) means waiting time after adhesive application until successful bonding of PU foams [min.]. Application is carried out about 20 hours after completion of the adhesive formulation.

Drying time (3) means waiting time after adhesive application until successful bonding of PU foams [min.]. Application is carried out about 120 hours after completion of the adhesive formulation.

Drying time (4) means waiting time after adhesive application until successful bonding of PU foams [min.]. Application is carried out about 720 hours after completion of the adhesive formulation.

TABLE 6

Study of the effect of pH value on the necessary waiting time/drying time until successful bonding of foams.

|  | 1* | 2* | 3* | 4* | 5 | 6 | 7 | 8 | 9 |
|---|---|---|---|---|---|---|---|---|---|
| Composition |  |  |  |  |  |  |  |  |  |
| Dispercoll ® C 84 | 100 | 100 | 100 | 100 | 100 | 100 | 100 | 100 | 100 |
| Glycine powder |  | 2 | 4 | 10 |  |  |  |  |  |
| Rhenofit ® DDA EM 50 | 2 | 2 | 2 | 2 | 2 | 2 | 2 | 2 | 2 |
| $CO_2$ |  |  |  |  | yes | yes | yes | yes | yes |
| Results: |  |  |  |  |  |  |  |  |  |
| pH value after 1 h | 12.3 | 9.3 | 9.0 | 8.7 | 9.5 | 9 | 8.5 | 8 | 7.5 |
| pH value after 20 h | 12.3 | 9.2 | 9.0 | 8.7 | 9.4 | 9.2 | ## | ## | ## |
| Solids content [%] | 54.9 | 55.4 | 55.8 | 57.2 | 54.9 | 54.9 | 54.9 | 54.9 | 54.9 |
| Viscosity [mPa * s] | 98 | 92 | 91 | 95 | 94 | 64 | 70 | 75 | 85 |
| Drying time (1) | 25 | 0.25 | 0.25 | + | 1 | 0.25 | + | + | + |
| Drying time (2) | 30 | 0.25 | 0.25 | # | 1 | + | ## | ## | ## |

+ immediately bondable,
coagulated,
solidified

The use according to the invention of carbon dioxide for activating adhesive formulations permits the establishment, in a simple and advantageous manner, of advantageous wet-on-wet adhesion properties, which are evident from the low waiting times necessary before bonding of the substrates with sufficient stability to application. After solidification of the adhesive formulation, it can advantageously be disposed of or re-used analogously to polychloroprene solid rubber.

TABLE 7

Study of the effect of different raw materials on activatability by means of conventional reagents in comparison with the use of $CO_2$ on the necessary waiting time/drying time until successful bonding of foams

|  | 10* | 11 |
|---|---|---|
| Composition |  |  |
| Dispercoll ® C XP 2694 | 100 | 100 |
| $CO_2$ |  | yes |
| Results: |  |  |
| pH value after 1 h | 9 | 8 |
| pH value after 20 h | 9.0 | 8.2 |
| Solids content [%] | 29.0 | 29.0 |
| Viscosity [mPa * s] | <10 | <10 |
| Drying time (1) | 0.5 | 0.3 |
| Drying time (2) | 0.5 | 0.3 |

The use according to the invention of carbon dioxide for activating adhesive formulations permits the establishment, in a simple and advantageous manner, of advantageous wet-on-wet adhesion properties, which are evident from the low waiting times necessary before bonding of the substrates with sufficient stability to application.

TABLE 8

Study of the effect of the concentration of the formulations on the activatability by means of conventional reagents in comparison with the formulation according to the invention on the necessary waiting time/drying time until successful bonding of foams

|  | 12* | 13* | 14 | 15 | 16 | 17 | 18 |
|---|---|---|---|---|---|---|---|
| Composition |  |  |  |  |  |  |  |
| Dispercoll ® C 84 | 100 | 100 | 100 | 100 | 100 ml | 100 ml | 100 ml |
| Glycine powder | 4 | 10 |  |  |  |  |  |
| Rhenofit ® DDA EM 50 | 2 | 2 | 2 | 2 |  |  |  |
| $CO_2$ |  |  | yes | yes | yes | yes | yes |
| Demineralised water | 145 | 145 | 145 | 145 |  |  |  |
| Mineral water Gerolsteiner Sprudel ™ classic |  |  |  |  | 100 ml |  |  |
| Mineral water Gerolsteiner Sprudel ™ medium |  |  |  |  |  | 100 ml |  |
| Coca Cola ™ |  |  |  |  |  |  | 100 ml |

TABLE 8-continued

Study of the effect of the concentration of the formulations on the activatability by means of conventional reagents in comparison with the formulation according to the invention on the necessary waiting time/drying time until successful bonding of foams

|  | 12* | 13* | 14 | 15 | 16 | 17 | 18 |
|---|---|---|---|---|---|---|---|
| Results: | | | | | | | |
| pH value after 1 h | 8.9 | 8.5 | 9 | 8 | 8 | 8.9 | 9.5 |
| pH value after 20 h | 8.9 | 8.5 | 9.0 | 8.1 | 8 | 8.9 | 9.5 |
| Solids content [%] | 31.7 | 32.9 | 30.8 | 30.8 | 42 | 28.0 | 28.0 |
| Viscosity [mPa * s] | <10 | <10 | <10 | <10 | <30 | <30 | <30 |
| Drying time (1) | 0.25 | + | 0.25 | + | 0.25 | 0.5 | 1.5 |
| Drying time (2) | 0.25 | 0.25 | 0.5 | + | 0.25 | 0.5 | 1.5 |

+ immediately bondable

TABLE 9

Study of the effect of different raw materials of the formulations on the activatability by means of conventional reagents in comparison with the formulation according to the invention on the necessary waiting time/drying time until successful bonding of foams. Post-activation of conventional formulations by means of carbon dioxide is also carried out.

|  | 19* | 20 | 21* | 22 |
|---|---|---|---|---|
| Composition | | | | |
| Dispercoll ® C 84 | | | 100 | 100 |
| Dispercoll ® C 2325 | 100 | 100 | | |
| Plextol ® 4545 | 25 | 25 | 30 | 30 |
| Bocherts ® ZnO VP 9802 | 1 | 1 | 1 | 1 |
| Borchigel ® Ala | | | | |
| Glycine powder | 4 | | 4 | |
| Rhenofit ® DDA EM 50 | 2 | 2 | 2 | 2 |
| $CO_2$ | | yes | | yes |
| Results: | | | | |
| pH value after 1 h | 9 | 8.5 | 9 | 8.5 |
| pH value after 16 h | 9.0 | 8.6 | 9 | 8.5 |
| Solids content [%] | 53.7 | 53.8 | 54.4 | 53.7 |
| Viscosity [mPa * s] | 4210 | 3860 | 4360 | 5500 |
| Drying time (1) | 0.5 | + | + | + |
| Drying time (2) | 0.25 | + | + | + |

+ immediately bondable

TABLE 10

Study of the effect of pH value of the formulations, adjusted in accordance with the invention, on the activatability and stability of the formulations (open time) and on the necessary waiting time/drying time until successful bonding of foams

|  | 23 | 24 | 25 | 26 | 27 | 28 | 29 | 30 |
|---|---|---|---|---|---|---|---|---|
| Composition | | | | | | | | |
| Dispercoll ® C 84 | | | 100 ml | 100 ml | 100 ml | 100 ml | 100 ml | 100 ml |
| Dispercoll ® C VPLS 2325 | 50 ml | 50 ml | | | | | | |
| Dispercoll ® C VPLS 2372H | 50 ml | 50 ml | | | | | | |
| $CO_2$ | | yes | yes | yes | yes | yes | yes | yes |
| Demineralised water | | 100 ml | | | | | | |
| pH value after 1 h | 7.3 | 7.3 | 8.2 | 8.9 | 8.5 | 8.1 | 9 | 9.6 |
| Solids content [%] | 56 | 28 | 55 | 55 | 55 | 55 | 55 | 55 |
| Viscosity [mPa * s] | 110 | <30 | 90 | 85 | 75 | 80 | 85 | 80 |
| Drying time (1) | + | 0.67 | + | + | + | + | 0.5 | >3 |
| Storage before application (h) Drying time [min] | (15)+ (39)## | (15) 0.7; (39) > 20 | (20) > 3; (48)## | (20) > 3; (48)# | (20) > 3; (48)## | (20) > 3; (48)## | (24) 0.5 | (16) > 3 |

+immediately bondable,
coagulated,
solidified

Excellent initial contact times and reactivities are obtained here with the pH value adjusted according to the invention, the open time tending to fall with the adjusted pH.

TABLE 11

Study of the effect of the pH value, adjusted according to the invention, of the formulations by varying the volumes of formulation and carbon dioxide used, on the necessary waiting time/drying time until successful bonding of foams

|  | 31 | 32 | 33 | 34 | 34 | 35 | 36 | 37 | 38 | 39 |
|---|---|---|---|---|---|---|---|---|---|---|
| Composition |
| Dispercoll ® C 84 (ml) | 50 | 100 | 150 | 200 | 250 | 300 | 350 | 400 | 450 | 500 |
| $CO_2$ (ml) | 500 | 450 | 400 | 350 | 300 | 250 | 200 | 150 | 100 | 50 |
| pH value after 20 h |  |  |  |  |  | 8.9 | 9.1 | 9.4 | 9.6 | 10 |
| Solids content [%] | 55 | 55 | 55 | 55 | 55 | 55 | 55 | 55 | 55 | 55 |
| Results: |
| Drying time (1) | + | + | + | + | + | + | 0.5 | 0.8 | 3 | >5 |
| Drying time (2) | ## | ## | ## | ## | ## | >4 | 0.5 | 0.75 | 3 | >5 |

+ immediately bondable,
solidified

Excellent initial contact times and reactivities are obtained here, with falling pH value, by increasing the volume of carbon dioxide metered in. When the open time has expired, a solid hydrogel is obtained which does not have to be disposed of as special waste.

TABLE 12

Study of the effect of the pH value adjusted according to the invention by means of carbon dioxide on the propertis of the formulations for bonding different substrates

|  | 40* | 41* | 42 | 43* | 44* | 45 | 46* | 47* | 48 |
|---|---|---|---|---|---|---|---|---|---|
| Composition |
| Dispercoll ® C 84 |  |  |  | 100 | 100 | 100 |  |  |  |
| Dispercoll ® C VP LS 2325 | 70 | 70 | 70 |  |  |  | 100 | 100 | 100 |
| Dispercoll ® C VPLS 2372H | 30 | 30 | 30 |  |  |  |  |  |  |
| Dispercoll ® S 3030 | 15 | 15 | 15 | 15 | 15 | 15 | 15 | 15 | 15 |
| Plextol ® 4545 not used? |  |  |  |  |  |  |  |  |  |
| Bocherts ® ZnO VP 9802 | 1 | 1 | 1 | 1 | 1 | 1 | 1 | 1 | 1 |
| Adjusted with glycine to pH |  | 9 |  |  | 9 |  |  | 9 |  |
| Rhenofit ® DDA EM 50 | 2 | 2 | 2 | 2 | 2 | 2 | 2 | 2 | 2 |
| Adjusted with $CO_2$ to pH |  |  | 9 |  |  | 9 |  |  | 9 |
| Results: |
| pH value | ca. 10 | 9 | 9 | ca. 10 | 9 | 9 | ca. 10 | 9 | 9 |
| Solids content [%] | 49.8 | 51.0 | 50.0 | 49.2 | 50.0 | 49.0 | 49.2 | 50.0 | 49.0 |
| Peel test result (N/mm), substrate KASX (NBR), age of the formulation ca. 2 h (5* roughened, dried for 40 min) | 1.6 | 1.8 | 2 | 2.1 | 2.2 | 2 | 1.8 | 1.9 | 1.5 |
| Softening point on KASX (° C.) | 76 | 73 | 75 | 59 | 57 | 57 | 91 | 85 | 88 |
| Peel test result (N/mm), substrate canvas, age of the formulation 10 d, drying for 5 min |  |  |  | 1.2 | 1.32 | 1.45 |  |  |  |

TABLE 12-continued

Study of the effect of the pH value adjusted according to the invention by means of carbon dioxide on the propertis of the formulations for bonding different substrates

|  | 40* | 41* | 42 | 43* | 44* | 45 | 46* | 47* | 48 |
|---|---|---|---|---|---|---|---|---|---|
| Peel test result (N/mm), substrate canvas, age of the formulation 10 d, drying for 1 min | 0.4 | 0.9 | 0.9 | 0.3 | 0.7 | 1.2 | | | |
| Peel test result (N/mm), substrate artificial leather, age of the formulation 10 d, drying for 2 min | | | | 0 | 0.1 | 0.7 | | | |

TABLE 13 continuation of Table 12

|  | 49* | 50* | 51 | 52* | 53* | 54 | 55* | 56* | 57 |
|---|---|---|---|---|---|---|---|---|---|
| Composition | | | | | | | | | |
| Dispercoll ® C 84 | 70 | 70 | 70 | 100 | 100 | 100 | | | |
| Dispercoll ® C VP LS 2325 | | | | | | | 70 | 70 | 70 |
| Dispercoll ® C VPLS 2372H | 30 | 30 | 30 | | | | 30 | 30 | 30 |
| Dispercoll ® S 3030 | 15 | 15 | 15 | 15 | 15 | 15 | 14 | 14 | 14 |
| Plextol ® 4545 | | | | | | | 5 | 5 | 5 |
| Bocherts ® ZnO VP 9802 | 1 | 1 | 1 | 3.5 | 3.5 | 3.5 | 1 | 1 | 1 |
| Adjusted with glycine to pH | | 9 | | | 9 | | 9 | | |
| Rhenofit ® DDA EM 50 | 2 | 2 | 2 | 2 | 2 | 2 | 2 | 2 | 2 |
| Adjusted wtih $CO_2$ to pH | | | 9 | | | 9 | | | 9 |
| pH value | ca. 10 | 9 | 9 | ca. 10 | 9 | 9 | ca. 10 | 9 | 9 |
| Solids content [%] | 49.8 | 51.0 | 50.0 | 48.2 | 49.0 | 48.0 | 50.1 | 51.0 | 50.1 |
| Results | | | | | | | | | |
| Peel test result (N/mm), substrate KASX, age of the formulation ca. 2 h (5* roughened, dried for 40 min) | 2.1 | 2.3 | 2.5 | 2.3 | 2.6 | 2.4 | 2.2 | 2.3 | 1.9 |
| Softening point on KASX [° C.] | 56 | 56 | 55 | 58 | 55 | 58 | 79 | 73 | 74 |
| Peel test result (N/mm), substrate canvas, age of the formulation 10 d, drying for 1 min | 0.4 | 0.8 | 1 | 0.3 | 1.2 | 1.2 | 0.5 | 0.8 | 0.9 |

TABLE 14 continuation of Table 13

|  | 58* | 59* | 60 | 61* | 62* | 63 |
|---|---|---|---|---|---|---|
| Composition | | | | | | |
| Dispercoll ® C VP LS 2325 | 100 | 100 | 100 | 10 | 10 | 10 |
| Dispercoll ® C VPLS 2372H | | | | 90 | 90 | 90 |
| Dispercoll ® S 3030 | | | | 15 | 15 | 15 |
| Plextol ® 4545 | 25 | 25 | 25 | | | |
| Bocherts ® ZnO VP 9802 | 1 | 1 | 1 | 1 | 1 | 1 |
| Adjusted with glycine to pH | | 9 | | | 9 | |

TABLE 14-continued continuation of Table 13

|  | 58* | 59* | 60 | 61* | 62* | 63 |
|---|---|---|---|---|---|---|
| Rhenofit ® DDA EM 50 | 2 | 2 | 2 | 2 | 2 | 2 |
| Adjusted with $CO_2$ to pH |  |  | 9 |  |  | 9 |
| pH value | ca. 10 | 9 | 9 | ca. 10 | 9 | 9 |
| Solids content [%] | 53.4 | 54.0 | 53.4 | 51.0 | 52.0 | 51.0 |
| Results: |  |  |  |  |  |  |
| Peel test result (N/mm), substrate KASX, (5* roughened, dried for 40 min) | 2.5 | 2.1 | 2.1 | 2.2 | 2.3 | 1.7 |
| Softening point on KASX, age of the formulation 5 d (° C.) | 75 | 73 | 81 | 50 | 52 | 51 |
| Peel test result (N/mm), substrate canvas, age of the formulation 10 d, drying for 5 min | 0.6 | 0.9 | 0.9 | 0.4 | 0.9 | 0.8 |

The adhesive formulations according to the invention permit the establishment of advantageous wet-on-wet adhesion properties, which are evident from the low waiting times necessary before successful bonding of the substrates, in combination with good initial strengths. The results of the formulations according to the invention activated with carbon dioxide, which have very short drying times, are particularly advantageous. The mentioned formulations according to the invention all exhibit good to very good open times.

TABLE 15

Study of the effect of the solids content on the properties of the formulations according to the invention in respect of the necessary waiting times until successful bonding of foams

|  | 64 | 65 | 66 | 67 | 68 | 69 | 70 | 71 | 72 | 73 |
|---|---|---|---|---|---|---|---|---|---|---|
| Composition |  |  |  |  |  |  |  |  |  |  |
| Dispercoll ® C 84 (ml) | 100 | 100 | 100 | 100 | 100 | 100 |  |  |  | 100 |
| Dispercoll ® C VP LS 2325 (ml) |  |  |  |  |  |  |  | 100 |  |  |
| Dispercoll ® C 74 (ml) |  |  |  |  |  |  | 100 |  |  |  |
| Dispercoll ® C VPLS 2372H (ml) |  |  |  |  |  |  |  |  | 100 |  |
| $CO_2$ | yes | yes | yes | yes | yes | yes | yes | yes | yes | yes |
| Demineralised water (ml) |  | 10 | 25 | 35 | 55 | 80 |  |  |  |  |
| Results: |  |  |  |  |  |  |  |  |  |  |
| pH value after 1 h | 7.9 | 7.9 | 7.8 | 7.9 | 7.8 | 7.8 | 7.7 | 7.8 | 7.8 | 7.9 |
| pH value after 120 h | ## | 7.3 | 7.1 | 6.9 | 7 | 6.9 | 7.8 | ## | 7.9 | ## |
| Solids content [%] | 55 | 50 | 45 | 40 | 35 | 30 | 58 | 55 | 58 | 55 |
| Viscosity [mPa * s] | 80 | <50 | <40 | <30 | <20 | <10 | 200 | ## | 180 | ## |
| Drying time (1) | + | + | + | + | + | + | + | + | + | + |
| Drying time (3) | ## | + | + | + | + | + | + | ## | + | ## |
| Drying time (4) | ## | ## | + | + | + | + | ## | ## | ## | ## |

+ immediately bondable,
solidified

The stability of the formulations according to the invention can advantageously be controlled by adjusting the pH value and the polymer concentration, excellent wet-on-wet adhesion properties nevertheless being achieved.

TABLE 16

Study of the effect of the solids content on the properties of the formulations according to the invention in respect of the necessary waiting times until successful bonding of foams

| | 74 | 75 | 76 | 77 | 78 | 79 |
|---|---|---|---|---|---|---|
| Composition | | | | | | |
| Dispercoll ® C 84 (ml) | 200 | | | | | |
| Dispercoll ® C 74 (ml) | | 200 | | | | |
| Dispercoll ® C VPLS 2372H (ml) | | | 200 | | 100 | 50 |
| Dispercoll ® C VP LS 2325 (ml) | | | | 200 | 100 | 50 |
| $CO_2$ (ml) overlaid in 500 ml vessel | 300 | 300 | 300 | 300 | 300 | 300 |
| Demineralised water | | | | | | 100 |
| Results: | | | | | | |
| pH value | 7.8 | 7.4 | 7.7 | 8 | 7.3 | 7.3 |
| pH value after (x) h | ## | 7.9 | 8 | ## | 7.9 | 7.4 |
| | (20) | (20) | (20) | (20) | (15) | (15) |
| Solids content [%] | 54.9 | 58.4 | 56.3 | 54.2 | 55.0 | 27.5 |
| Viscosity [mPa * s] | 57 | 53 | 38 | 65 | 75 | <10 |
| Drying time (1) | + | + | + | + | + | 0.6 |
| Drying time to successful bonding of PU foams [min.]. Application is made ca. (x) h after completion of the adhesive formulation. | ## | + | + | ## | + | 0.6 |
| | (120) | (120) | (120) | (120) | (15) | (15) |
| Drying time to successful bonding of PU foams [min.]. Application is made ca. 480 h after completion of the adhesive formulation. | ## | 0.75 | 0.3 | ## | | |

+ immediately bondable,
solidified

The adhesive formulations according to the invention permit the establishment of advantageous wet-on-wet adhesion properties even in a wide range of solids concentrations for very different polychloroprene-based dispersions. The open time is obviously dependent on the crystallisation speed and solids concentration of the dispersions, the lower the crystallisation speed and solids concentration, the longer the open time.

TABLE 17

Results from the process according to the invention for the production of large-volume moulded bodies

| | 80 | 81 | 82 | 83 | 84 |
|---|---|---|---|---|---|
| Composition | | | | | |
| Dispercoll ® C 84 (ml) | 200 | | | 100 | |
| Dispercoll ® C 74 (ml) | | 200 | | 100 | |
| Dispercoll ® C VPLS 2372H (ml) | | | | | 100 |
| Dispercoll ® C VP LS 2325 (ml) | | | 200 | | 100 |
| $CO_2$, to pH | 7.8 | 7.8 | 7.8 | 7.8 | 7.8 |
| Results: | | | | | |
| After pH adjustment, formulations are poured into an open 200 ml beaker, solidification after (x) h | 3 | 96 | 1 | 6 | 6 |
| Shore A hardness after 7 d, measured before storage/drying | 24 | 6 | 43 | 20 | 10 |
| Loss of volume (%) after 90 h storage at 50° C. | 38 | 32 | 39 | 38 | 36 |
| Loss in weight (%) after 90 h storage at 50° C. | 36 | 32 | 37 | 35 | 34 |
| Hardness in Shore A after 90 h storage at 50° C. | 75 | 33 | 75 | 58 | 38 |

TABLE 17-continued

Results from the process according to the invention for the production of large-volume moulded bodies

| | 80 | 81 | 82 | 83 | 84 |
|---|---|---|---|---|---|
| Density in g/cm² afer 90 h storage at 50° C. | 1.16 | 1.19 | 1.18 | 1.18 | 1.17 |

By the process according to the invention, hydrogels and porous large-volume bodies can be produced directly from crystallising dispersions without the need for prior conversion to solids with subsequent vulcanisation/chemical crosslinking. The large-volume bodies so obtained, because they are chemically uncrosslinked where required, can be recycled, for example by mechanical comminution and processing to solvent-borne adhesives or rubber components.

TABLE 18

Study of the activatability of adhesive dispersions by use of $CO_2$ as propellant gas

| | 85* | 86 | 87* | 88 |
|---|---|---|---|---|
| Composition | | | | |
| Dispercoll ® C 84 | 100 | 100 | | |
| Dispercoll ® C XP 2694 | | | 100 | 100 |
| Glycine | 2 | 2 | | |
| Results: | | | | |
| pH value | 9.2 | 9.2 | 9 | 9 |
| Solids content [%] | 56 | 56 | 29 | 29 |
| Viscosity [mPa * s] | 85 | 85 | <10 | <10 |
| Drying time (1) | | | | |
| Carrier gas for spray application was compressed air | 0.5 | | 0.5 | |
| Drying time (1) | | | | |

TABLE 18-continued

Study of the activatability of adhesive dispersions by use of $CO_2$ as propellant gas

|  | 85* | 86 | 87* | 88 |
|---|---|---|---|---|
| Carrier gas for spray application was $CO_2$ |  | + |  | 0.25 |

+ immediately bondable

By the process according to the invention, the activation by $CO_2$ can advantageously be carried out immediately prior to application, for example by using $CO_2$ as propellant/carrier gas for a spray application or mixing $CO_2$ with the carrier gas/substrate stream. An improvement in the wet-on-wet adhesion properties is again achieved.

The invention claimed is:

1. A process for the preparation of a formulation based on an aqueous polymer dispersion containing >20 wt. % of an anionically stabilised polychloroprene dispersion, wherein the total solids concentration=100 wt. %, characterised in that, at a pH value of from 6 to 10, the amount of dissolved carbonic acid in the dissociation equilibrium is from 0.0001 to 2 wt. %, based on the dispersion, the process comprising feeding carbon dioxide in an amount, per liter of formulation, of from 0.1 to 20 liters at from 1 to 100° C. and from 0.8 to 10 bar to an aqueous polymer dispersion containing an anionically stabilised polychloroprene dispersion.

2. The process according to claim 1, characterised in that the carbon dioxide volumes are supplied by overlayering of the dispersion inside a resilient vessel, and the vessel is then shaken or stirred or stored until the desired reduction in volume of the gas phase has been achieved, and any excess carbon dioxide is let off.

3. The process according to claim 1, wherein at a pH value of from 6.5 to 9.5, the amount of dissolved carbonic acid in the formulation is from 0.001 to 1 wt. %.

4. The process according to claim 1, wherein the formulation has an alkali ion concentration ($Na^+ + K^+$) from 500 to 10,000 ppm.

5. The process according to claim 1, wherein the formulation comprises hydrophilised polyisocyanates.

6. The process according to claim 5, wherein the hydrophilised polyisocyanates are based on aliphatic isocyanates.

7. The process according to claim 1, wherein the formulation comprises contains nanodisperse silicic acid suspensions in water.

8. The process according to claim 1, wherein the formulation has a pH value stability according to DIN 53381, Method B, of >1 hour.

9. A process for preparing adhesive formulations, comprising applying a formulation produced by the process according to claim 1 to a substrate.

10. A process for producing foamed, optionally tacky sealants and insulating materials, large-volume parts, coatings, adhesive foams or dipped goods, comprising foaming a formulation produced by the process according to claim 1.

11. A process for producing a hydrogel, comprising controlled gelling of a formulation produced by the process according to claim 1 to form a hydrogel.

* * * * *

UNITED STATES PATENT AND TRADEMARK OFFICE
CERTIFICATE OF CORRECTION

PATENT NO. : 8,658,760 B2
APPLICATION NO. : 13/062538
DATED : February 25, 2014
INVENTOR(S) : Achten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 176 days.

Signed and Sealed this
Twenty-ninth Day of September, 2015

Michelle K. Lee
*Director of the United States Patent and Trademark Office*